United States Patent [19]

Deffeyes

[11] 4,237,189
[45] Dec. 2, 1980

[54] POLYMODAL MAGNETIC RECORDING MEDIA PROCESS FOR MAKING AND VERIFYING THE SAME AND COMPOSITIONS USEFUL THEREIN

[75] Inventor: Robert J. Deffeyes, 804 Red Oak La., Arlington, Tex. 76012

[73] Assignee: Robert J. Deffeyes, Arlington, Tex.

[21] Appl. No.: 411,253

[22] Filed: Oct. 31, 1973

[51] Int. Cl.$^2$ ............................................. H01F 10/02
[52] U.S. Cl. ................................... 428/457; 428/329; 428/900
[58] Field of Search ............................. 117/235–240; 428/900, 457, 329; 427/127–132

[56] References Cited

U.S. PATENT DOCUMENTS

| | | | |
|---|---|---|---|
| 2,694,656 | 11/1954 | Camras | 117/235 |
| 3,149,996 | 9/1964 | Wagner et al. | 117/235 |
| 3,219,353 | 11/1965 | Prentky | 274/41.4 |
| 3,328,195 | 6/1967 | May | 117/239 |
| 3,653,962 | 4/1972 | Akashi et al. | 117/235 X |
| 3,689,317 | 9/1972 | Akashi et al. | 117/240 |
| 3,725,126 | 4/1973 | Haller et al. | 117/235 |
| 3,740,266 | 6/1973 | Akashi et al. | 117/240 |
| 3,761,311 | 9/1973 | Perrington et al. | 117/240 X |
| 3,767,464 | 10/1973 | Akashi et al. | 117/235 X |
| 3,775,178 | 11/1973 | Perrington et al. | 117/240 X |
| 3,790,754 | 2/1974 | Black et al. | 235/61.7 |

FOREIGN PATENT DOCUMENTS 2403401  1/1973  Fed. Rep. of Germany .
30-2427  4/1955  Japan .

*Primary Examiner*—Bernard D. Pianalto
*Attorney, Agent, or Firm*—Robert A. Cesari; John F. McKenna; Andrew F. Kehoe

[57] ABSTRACT

Polymodal magnetic information-recording articles formed with at least two different populations of magnetic powders, whereby at least one of the powders, being of lower intrinsic coercivity and forming means to accept a noise interference pattern, accepts a pattern which serves as a means to verify the authenticity or detect previous tampering with the magnetic recording device. More generally, the disclosure relates to polymodal recording media characterized by incorporation of a plurality of independently - erasable ferromagnetic powder populations and processes for making and using said media.

15 Claims, 13 Drawing Figures

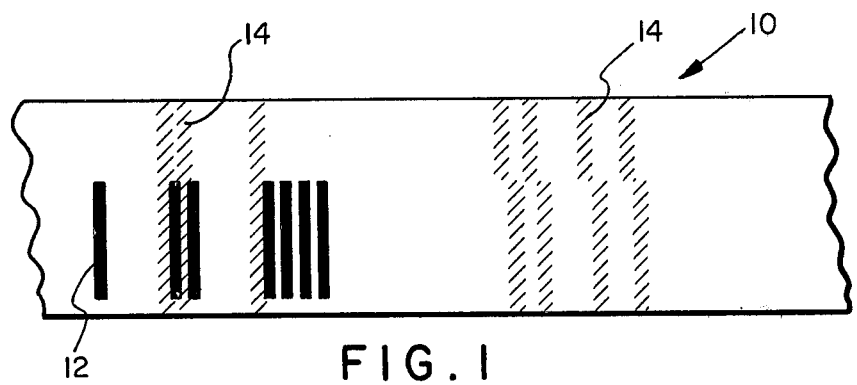
FIG. 1
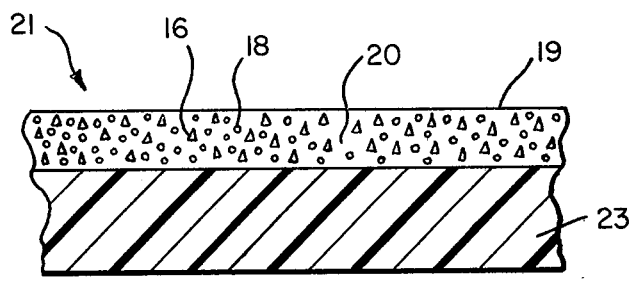
FIG. 2
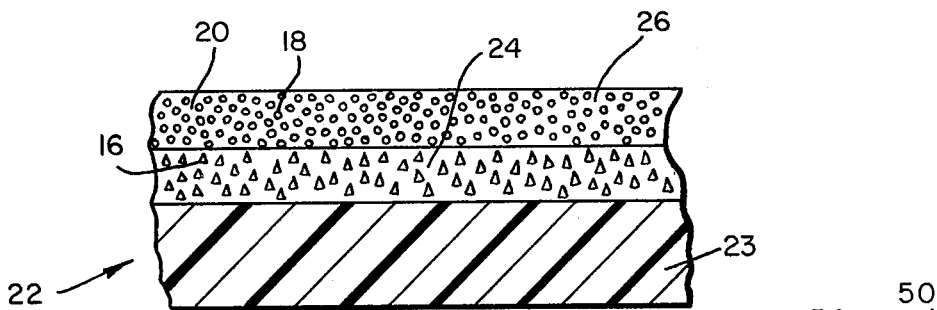
FIG. 3
FIG. 13
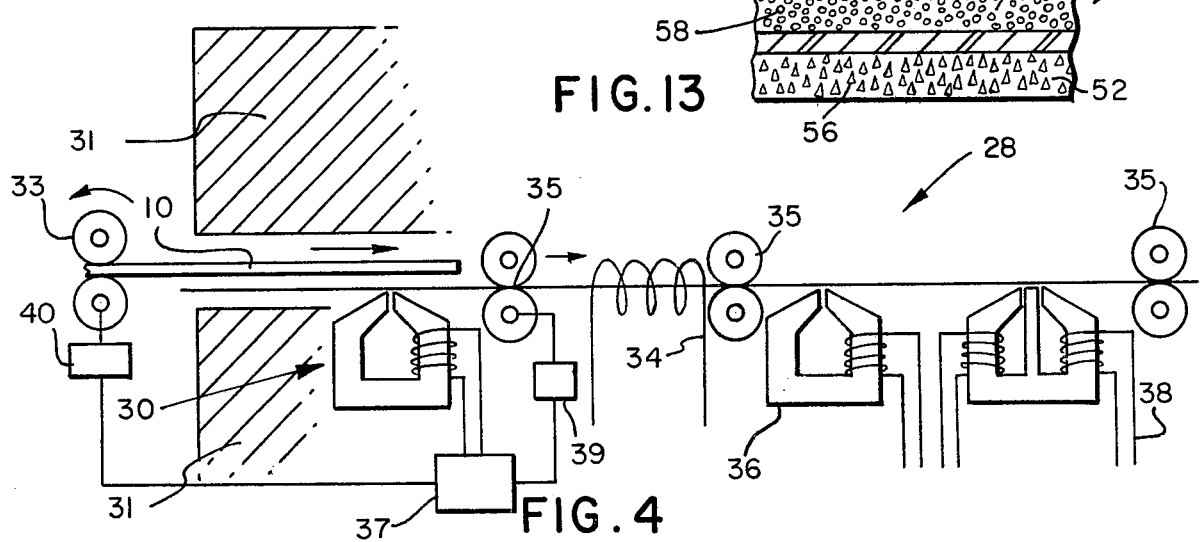
FIG. 4

POLYMODAL MAGNETIC RECORDING MEDIA PROCESS FOR MAKING AND VERIFYING THE SAME AND COMPOSITIONS USEFUL THEREIN

BACKGROUND OF THE INVENTION

Automatic information reading from bank credit cards, transportation fare cards, and like objects is rapidly gaining acceptance as the society moves towards a "cashless" money system. The information is usually placed, visibly or invisibly, on an article and read by mechanical means, by light-detection means or by magnetic-sensing means. For example, the so-called magnetic-stripe credit cards or fare cards are particularly attractive because of their ease of manufacture. Unfortunately, this type of card has been demonstrated to be easily counterfeited. Despite this known fact, the convenience of the "magnetic stripe" approach has caused the American Bank Association to pick the magnetic stripe as its standard for bank card credit plans.

In other magnetic recording systems, it is also desirable to have some means of building more security into the system. For example, knowledge of a code key would be useful in screening access to information stored on magnetic tape. This code key might be mechanical or electrical according to known procedures. But, such systems would not adequately discriminate between persons who are allowed access to some tapes but not allowed to retrieve information on other tapes. It would be convenient if each package of information, say each magnetic tape in a given library, held a code signal which had to be recognized by the retriever before being erased to reveal the primary information on the tape. It would be further convenient if the code could be changed from time to time as the authorized personnel change.

In general then, it would be convenient to provide magnetic recording media capable of carrying two independent signals in the same recording area.

In a hindsight review of art bearing some relationship to fields relating to the invention, the following art was located:

U.S. Pat. No. 3,601,913 to Pollock suggests a device utilizing a mixture of high and low coercivity materials. The utility of this system depends on the detection of magnetic voids caused by mechanical displacement of magnetic powder bearing surfaces. Pollock also suggests that use of such mixtures, will make card counterfeiting more difficult. But Pollock uses his mixture only to complicate the manipulative acts of duplicating a card; the individual components serve no distinct functions except in instances wherein they are at least partly non-congruent so that they yield a visually-identifiable pattern or a geometrically-distinct identifying pattern, formed of one of the magnetic powders. In general, the powders simultaneously respond to the field as a single-population powder would.

Moreover, the chromium oxide and iron oxide mixtures of the Pollock patent would be inoperable in forming combinations for use in such processes as are to be described below.

In recently-issued U.S. Pat. No. 3,761,311 to Perrington et al, there is described a dual layer magnetic tape, each layer having different nominal coercivities. It is believed that such a tape is sold under the trade designation Scotch Brand C-60 Cassette Cobalt-Energized High-Energy Type (Catalog Number S-C-60ME) by 3M Company. That tape is not bimodal, probably because magnetic interaction substantially prevades the ultra-thin layer of the tape. Moreover, since it was developed for, and is sold to, a specific audio recording market, it is clearly not intended for any bimodal use.

In the following specifications the term "card" will be used in the sense of a mechanical equivalent of any article which carries magnetic material in information-yielding arrangement. It will be obvious that the scope of the kinds of members which can be tagged with magnetic identification means is very broad and that such recording members are mechanical equivalents to the credit card referred to in this application.

SUMMARY OF THE INVENTION

It is a principal object of this invention to provide novel multi-modal ferromagnetic recording members. It is also an object of the invention to provide a magnetic information bearing credit card which is relatively difficult to counterfeit, or duplicate surreptitiously in such a way as to allow misuse of the counterfeit or duplicate card.

It is a further object of the invention to provide a means to warn a magnetic-card holder that his card has been subject to tampering.

Another object of the invention is to provide a process for making a counterfeit-proof credit card.

Still another object of the invention is to provide novel processes for verifying and reading a credit card.

A further object of the invention is to provide novel apparatus for reading and verifying a credit card.

Another object of the invention is to provide a novel magnetic composition particularly useful in making the credit card of the invention.

Other objects of the invention will be obvious to those skilled in the art on reading this application.

Applicants invention is based on the use of a magnetic identification medium formed of at least two distinct populations of ferromagnetic powders, wherein a first population is selected so that it can be magnetically switched, i.e. recorded upon, by a magnetic field at which a second population will not be switched. Each population is also responsive to differing stimuli, say differing magnetic fields or temperatures, for erasing information therefrom; that is magnetic information can be retained by one population as magnetic information is erased from another population.

The term "mixture" as used above is with respect to the "mix" or particles sensible by a magnetic recording device. For the purposes of the invention, it is immaterial whether or not the sensed mix is formed (a) of congruent recording layers each of which holds a different particle population or, (b) of a single composition which comprises the two or more magnetic populations intermixed with each other. Notwithstanding the foregoing statement, and as will be discussed in more detail below, some magnetic populations interact excessively and require special spatial separation techniques to be useful in some procedures.

In a typical procedure, a magnetic strip of a credit card will be formed of powders of 200 and 800 oerstead coercive force respectively. These powders are intermixed and dispersed in a polymeric matrix according to manipulative procedures well known in the magnetic-information-recording art. The resulting mixture is used to form the strip of a credit card.

A relatively high magnetic field, say a 3000 oerstead field, is used to record the primary functional information on the credit card. All particles would respond to such a recording field. Next, however, a 300-oersted recording field is used to record a "noise" signal on the lower-coercivity material only and across the strip. The noise signal will be sufficiently strong to mask the primary functional information on the credit card.

According to the system of the invention, the card of the invention is advantageously utilized with a verifying and recording device so constructed that, when a card is presented to the device, the following events occur:
1. The card would be checked for the presence of the noise signal.
2. If the noise signal is absent, the card would be erased and thereby permanently invalidated; if the noise is present, proceed to event 3.
3. The noise signal only would be erased* by, e.g. a 300-oersted alternating current field.
4. Then the primary functional information recorded at the 3000-oersted field would be read by the machine.
5. The appropriate noise signal would once again be recorded to mask the primary functional signal.

*By "erased", is meant erased to the extent that it no longer effectively masks the high-coercivity signal.

If the card is rejected at Event 2, the user would have reason to suspect that the card has been tampered with, at, or since, its last use. It should be noted that the above sequence can be varied depending on the business policy of the organizations involved. For example, it might be desirable to proceed through reading information on the card before erasing it. Such a procedure would facilitate location of the prior billing status and, perhaps, the site of repeated tampering activity. Moreover, in specific locations where any substantial number of people may come in contact with erase fields during their employment or otherwise; it might be prudent to accept the billing before invalidating the card and so informing the card holder of the prospective invalidity of his card. Those skilled in the art and faced with particular business problems will, no doubt think of other situations making certain function-sequencing procedures desirable.

In appropriate circumstances, three or more distinct powders can be used. Two of the powders might function as described above, while another powder, say one with a coercivity of 1100 or so could be checked for other information, say a maximum charge limit or the like.

Another variation, or utility, which can be imparted to a card would be that different card issues would have different noise signals and a card bearing a signal recognized as legitimate, but not authorized at the particular charging station, would be rejected but without erasing the authorized signal.

As an alternative to Event 4 listed above, one can "read" the signal by means of anhysteretic duplication. In this situation a ordinary, iron-oxide-type magnetic tape could be placed in contact with the card of the invention. The signal from the high coercivity material on the card would transfer to the ordinary tape during the erasure of the noise signal. The ordinary tape could then be used to store transaction information for later transfer to a reading apparatus, say at a computer center. For the purposes of this application, a common magnetic tape so employed is meant to be included within the definition of the term "reading means".

It is also contemplated that the systems of the invention can be utilized in conjunction with other security procedures. For example, different populations could be recorded and read with the recording and reading heads mounted at different angles to the path of the magnetic recording medium.

The present invention may also be utilized with a variable erase head reading machine whereby one (1) puts in a tape, say from a tape library available to certain people only some of whom you want to be able to read certain tapes; and (2) tells the machine electronically by a code known to him, what coercivity and what pattern of noise must be erased to read the information. If he uses the wrong code, the machine refuses to proceed (or actuate an alarm or whatever); if he is an authorized person, i.e. he has the right code, he can read the tape because the machine checks for the indicated noise signal, erases it, etc.

Powders useful in the invention can be selected from a large number known to the art. In general, the higher coercivity powders are conveniently cobalt-containing metal powders having an intrinsic coercive force of about 500 to 1100 or more. Materials of this type are commercially available from The Cobaloy Company, a division of Graham Magnetics, Inc. The powders having the lower coercive forces are conveniently gamma $Fe_2O_3$ powders of intrinsic coercive force of about 350 or below. Such iron oxide powders are readily available from the several suppliers presently supplying pigments for audio and video tape manufacture.

Other useful powders are those such as the stabilized chromium dioxide powders of the type sold under the trade designation Crolyn by E. I. DuPont and Company. When selected as the lower coercivity powder, this material can have a noise-signal erased conveniently by a heating means, because of its curie point is only about 130° C.

Chromium dioxide is a possible substituent for all or some of the preferred low-coercivity iron oxide. However, chromium dioxide-base material having a coercivity of about 400 also could be used as the higher coercive-force component with a low coercivity ferromagnetic metal powder.

Another important advantage of chromium dioxide is that it may be used with a relatively small amount of high-coercivity material because, after being erased thermally, it will, on cooling, tend to switch in a pattern dictated by the high coercivity material, thereby increasing the signal recorded thereon.

There are also some iron-oxide-based materials, e.g. cobalt-doped gamma $Fe_2O_3$ and $Fe_3O_4$, which can be used as the low-coercivity material when used in accordance with the teachings of this disclosure In general, it is desirable to have populations in a bimodal system characterized by coercivity values have a difference of at least 200. In practice, bimodal systems may be selected to have differences of 1000 or greater. If additional functionality is built into a ferromagnetic system by adding different modes, the higher and lower coercivities will usually differ by at least a factor of 200 $(X-1)$ wherein X is the number of modes and it will be advantageous to keep the coercive force difference between the different populations at 200 oersteds or more.

The geometry of the powders selected for use in multimodal magnetic recording media prepared according to the invention will advantageously be selected with respect to the particular utility for which the media are intended. Thus, acicular powders tending to orient strongly will be preferred in magnetic tape application, but square or round particles are entirely suitable for such applications as magnetic disks.

The discovery that certain combinations of powders can be utilized in achieving such distinctly polymodal ferromagnetic systems is unexpected in view of the performance of mixtures formed of the ferromagnetic powders most generally used in the art. For example, a mixture formed of a first iron oxide, a second iron oxide and cobalt-based metal powders having coercivities of 180, 320 and 1000, respectively, yielded a low-coercivity peak which was not distinct although there were distinct peaks between the low coercivity materials and the high coercivity material.

The above result may be partly understood in view of the teaching that the peaks should be about 200 oersteds apart. However, the two low coercivity powders interact more than would be expected on the sole basis of the insufficient difference in coercivities.

It has been noted that mere differences in powder coercivity will not allow indiscriminate manufacture of polymodal recording products. For example, and for reasons not fully understood, trimodal mixture of gamma $Fe_2O_3$ (Hc of 180), cobalt-doped $Fe_2O_3$ (Hc of 400) and cobalt-based metal powder of the Cobaloy type (Hc 1000) will not result in an effective trimodal recording system. Indeed, when the metal is replaced with a cobalt-doped powder having a coercivity of 900, the mixture is substantially unimodal. Similarly, if one combines (a) chromium dioxide sold under the trade designation Crolyn by E. I. DuPont de Nemours Co. and (b) gamma ferric oxide such as is sold by Hercules Corporation under the trade designation HR 280 into an attempted bimodal formulation, then one obtains a unimodal result notwithstanding the fact that the former powder has a coercivity of 547, the latter a coercivity of only 299.

The nature of the magnetic interaction that produces this result is not known precisely. Without intending to be bound by the theory, it is suggested that substantial differences in powder density and/or Bm values should exist between at least two of the powders used in the system. For example, the metal particles illustrated herein have specific gravities of about 8.5 and a Bm value of from about 8000 to 20,000 gauss whereas the oxides have much lower specific gravity (about 4.4) and a much lower magnetic moment, typically about 3000 to 4000 gauss.

In general, it appears that the metal powders, i.e. those of Bm values exceeding about 8000 gauss are the most advantageous for use in forming bimodal systems, in that they can be used successfully in combination with oxides and other metal powders.

Metal oxides, on the other hand, tend to interact one with the other in most convenient methods of practicing the invention, i.e. of making bimodal recording systems. However, it should be emphasized that it is possible to form bimodal systems of different oxides, say of cobalt-doped iron oxide and chromium dioxide, when care is taken to avoid interaction. Among the ways this can be accomplished is to place a thin insulating layer, say a layer of polymeric film of some other such spacer means between congruent layers of two oxides. In such a system, both of the oxides would conveniently be held in a polymer matrix. Another means for achieving such a bimodal system would be to so distribute the two oxides in a single matrix so that the particles of the different oxides are sufficiently spaced from each other that they do not interact magnetically. Such spacing techniques tend to result in a reduced information-receiving capacity per area and will not be convenient for most applications.

Some typical Bm values are 3400 for gamma $Fe_2O_3$, 4000 black $Fe_3O_4$, about 16,000 for the cobalt metal powder of Example 1 below and about 13,000 for the low-coercive force metal powder of Examples 2 and 3.

While emphasis is placed on use of different ferromagnetic powders to make polymodal recording systems, it should be stated, and will be obvious to those skilled in the art on their reading this description, that metal films of appropriate magnetic properties can be substituted for one or more of the ferromagnetic powder components used in polymodal systems.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

FIG. 1 is a diagrammatic representation of a credit card prepared according to the invention.

FIG. 2 is a section of one tape of a card using a bimodal mixture of magnetic particles.

FIG. 3 is a section of another type of card showing a bimodal laminar arrangement of different magnetic powders.

FIG. 4 is a schematic diagram showing one embodiment of a card verifier and reader apparatus.

Figure 5:
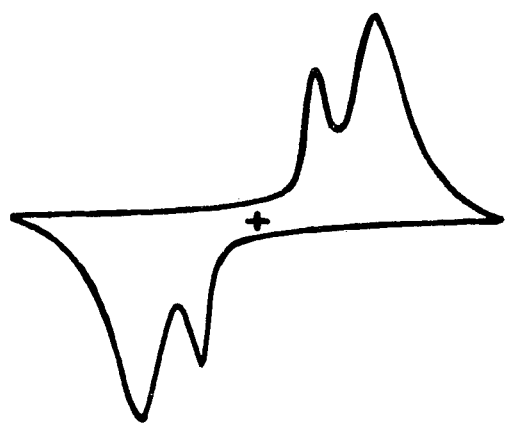
FIG. 5 through 12 represent some characteristic magnetic property curves of the compositions utilized in the invention.

Referring to FIG. 1, it is seen that a credit card 10 comprises digital billing information pattern 12 and a noise pattern 14. Of course, these two overlapping patterns are not visible but merely represent magnetic states of a bimodal population of particulate magnetic powder.

FIG. 2 schematically shows the distribution of the higher coercivity magnetic material 16 and a lower coercivity magnetic material 18 in a segment 19 of a credit card 21. The magnetic materials are held in a polymeric matrix 20 as is known in the art and supported on a polymer-film substrate 23.

FIG. 3 illustrates a card 22 having a similar construction but wherein the different magnetic populations are in separate layers, the higher coercivity material 16 being in the lower layer 22 and lower coercivity material 18 being in the upper layer 26.

FIG. 4 shows, diagrammatically, the arrangement of members in an apparatus 28 used to verify and read magnetic recording media of the invention.

Playback head 30 in housing 31 forms means to monitor the magnetic recording medium for the presence of an noise signal which has been imparted to the low coercivity powder population. If the signal is detected, advancement mechanism 35 is actuated. Erase coil 34 then erases the card 10 as it traverses therethrough. Data-reading head 36 reads the information imparted to the high coercivity material and the card continues through to the recording head 38 which re-records the noise signal on the card, thereby preparing it for future use. The card is carried into the apparatus by card-moving means 33 which is actuated by conventional means when a card is inserted into apparatus 28. If the noise signal is not sensed, amplifier and control circuit 37 will not actuate the motor 39 and consequently will not actuate the advancement mechanism 35. Thus, card 10 will not be carried beyond means 33. Circuit 37 will cause 2-way motor 40 to reverse and reject the card under this set of circumstances. The control circuits utilize known art, are not shown in the drawings in order to allow a clearer presentation of the invention.

Figure 6:
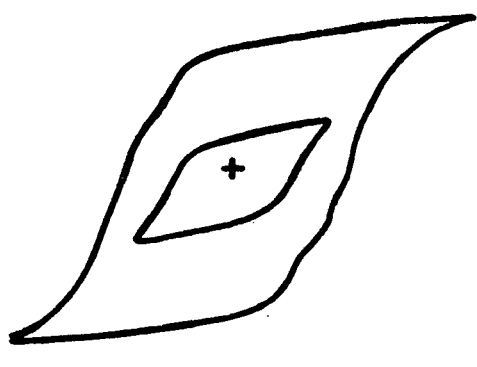

FIG. 6 is a histogram (BH loop) showing the hysteresis loops of a ferromagnetic powder composition useful in the practice of the invention. The composition is formed of a cobalt-based alloy powder having a coercivity of about 600 oersteds and a iron oxide (gamma $Fe_2O_3$) powder having a coercivity of about 350 oersteds. The inner loop is taken over a field of about 350 oersteds; the outer loop is taken over a field of about 1000 oersteds.

Figure 7:
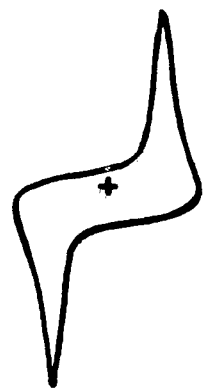

FIG. 7 is a non-integrated dM/dt curve taken in a field of 300 oersteds and showing only the $Fe_2O_3$ switching.

Figure 8:
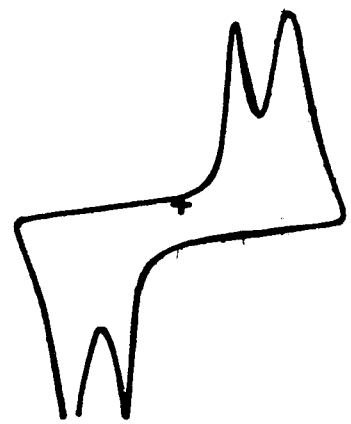

FIG. 8 is taken in a field of 650 oersteds and shows both materials switching.

FIG. 5 is similar to FIG. 8 except it is taken in a field of 1000 oersteds.

FIG. 13 shows a bimodal tape 50 having high coercivity and low coercivity layers, 52 and 54 respectively separated by backing. The layers are conveniently formed with cobalt-doped iron oxide 56 and chromium dioxide 58, respectively.

EXAMPLE 1

A cobalt metal powder was selected which had the following characteristics:

| Coercive Force: | 1010 at 25° C. |
|---|---|
|  | 1380 at −196° C. |

A series of such powders having difference coercivities are available from the Cobaloy Division of Graham Magnetics, Inc. under the trade designation Cobaloy.

A quantity of 100 grams of the powder is mixed into a solution consisting of 67.5 grams of a polyurethane resin known as Estane 5707, and 380 grams of tetrahydrofuran. The resulting composition is mixed in a shaker mill with ⅛ inch stainless steel shot for about 20 minutes. Thereupon 10 grams of soya lecithin was added and mixed until dissolved. A quantity of 200 grams of an iron oxide sold under the trade designation HR 280 by Hercules Corporation and characterized by a coercive force of about 280. This material is mixed into the cobalt-bearing composition. Then the composition is warmed sufficiently to drive off 200 grams of the tetrahydrofuran.

The composition is then ball milled (using ⅜ inch stainless steel balls) for about 17 hours before being coated in a strip on a release paper substrate and dried. The coating is dried, then the paper is cut into 0.25 inch strips. These strips are fastened, adhesively or by heat sealing, to credit card stock.

A card, so formed, is recorded with a recording head, sold under the Trademark Spinalloy by Spin Physics of San Diego, Calif. A 3000-oersted field is used, and the pattern is representative of digital information commonly used for billing purposes by credit-card issuing people. After being so-recorded the card is erased with a 300-oersted AC field to assure that the iron-oxide component is reasonably clear of any signal. A noise pattern is then recorded (with a 300-oersted field) on the iron oxide.

Thus prepared, the card is ready for use by a customer.

EXAMPLE 2

A trimodal powder composition was prepared from the following ferromagnetic powders:

| wt. % | Coercivity | Powder Identity |
|---|---|---|
| 10 | 125 | FeMnNiCo Cobaloy powder |
| 20 | 330 | iron oxide* |
| 70 | 1000 | Example 1, cobalt-based |

*Available under the trade designation MO 2228 from Charles Pfizer Company.

FIGS. 9 through 12 illustrate this response of a trimodal ferromagnetic system to magnetic fields of different magnitudes.

Figure 9:

FIG. 9 shows a non-integrated dM/dt curve taken in a field of 300 oersteds. The FeMnNiCo powder is switching in this field.

Figure 10:
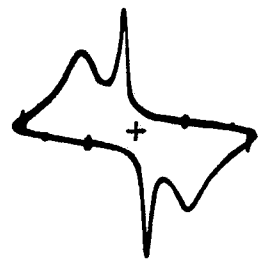

FIG. 10 shows the iron oxide material switched as the field goes to 1000 oersteds.

Figure 11:
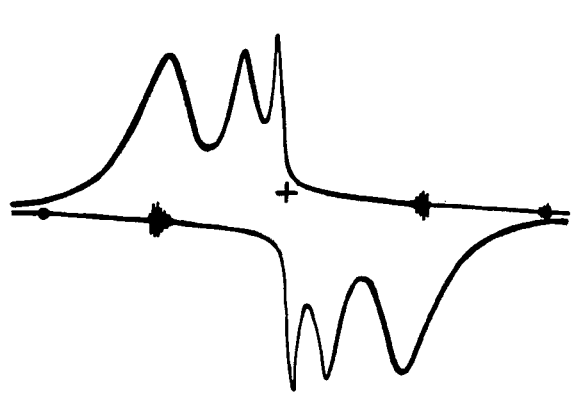

FIG. 11 illustrates all of the powder populations switched in a field of 3000 oersteds.

Figure 12:
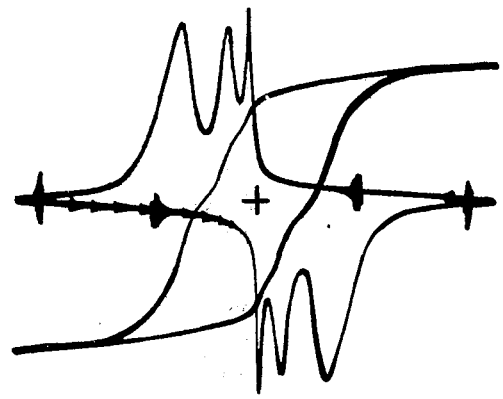

FIG. 12 shows an integrated hysteresis loop superimposed on a non-integrated dM/dt curve as shown in FIG. 11.

The composite drawings of the hysteresis loops and non-integrated dM/dt curves were prepared from photographs of oscilloscope curves which were taken as follows: The magnetic field to which the system being tested was subjected, is set at 1650 oersteds. The height of the BH curve (the B value) was adjusted arbitrarily until it was 6 scale units high. A photograph was then taken of the normal hysteresis curve. The apparatus was then switched so the oscilloscope showed the non-integrated dM/dt curve and the attenuator was cut down by a factor of five. Then the photograph of the dM/dt curves were taken as a double exposure.

EXAMPLE 3

A composition was prepared from Powders 1 and 2 of FIG. 3. It was tested and found to be bimodal. Thus it is seen that undesirable magnetic interaction is seen primarily in systems using a plurality of metal oxide populations. Use of a plurality of high-density, i.e. predominantly metal powders of appropriate coercivity differences appears to be appropriate in manufacture of polymodal magnetic recording systems.

Orientation of the particles during the manufacture of the tape, e.g. by use of a magnetic field applied after the powder-bearing coating is applied to the substrate and as is known to the art, enhances polymodal characteristics of the product.

In general, the peaks visible on a non-integrated dM/dt curve of an advantageous polymodal system can usually be recognized in two ways:

1. As one raises the field on a BH meter the lower-coercivity curves will be substantially complete before the appearance of the next higher curve.
2. The valleys between adjacent peaks are advantageously of a depth equal to at least one half of the average height of the adjacent peaks over a base line.

Polymodal recording members of the type described herein are new. The name has been selected to describe a device which has the ability to carry at least two independently-functioning magnetic signals in a given plane (e.g. in a given coating containing two ferromagnetic powders) or in proximate and congruent planes (e.g. in adjacent layers of ferromagnetic materials or two such layers that are separated by a thin sheet of barrier material).

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. In an article comprising a ferromagnetic composition adapted to be processed in a magnetic field to receive a pattern which pattern can be sensed by a magnetic reading head, the improvement wherein said ferromagnetic composition comprises at least two different populations of ferromagnetic material intermixed within a matrix, each of said populations forming means to store, independently from one another, magnetically-recorded information and wherein a first said population is so selected that it can be magnetically switched at a magnetic field intensity at which a second said population of said composition is not affected and wherein a non integrated dM/dt curve of the magnetic populations will exhibit a valley between two adjacent peaks equal to at least one-half the average distance from the base line to top of said peaks.

2. An article as defined in claim 1 wherein at least one said ferromagnetic material is a metal powder.

3. An article as defined in claim 2 wherein said coercivity of the first population is below about 400 and the coercivity of said second population is above about 600.

4. An article as defined in claim 2 wherein said first population is selected from iron-oxide powder or chromium oxide powder.

5. Article as defined in claim 4 wherein the Bm value of at least one said ferromagnetic material is above 8,000 gauss.

6. An article as defined in claim 1 wherein said coercivity of the first population is below about 400 and the coercivity of said second population is above about 600.

7. Article as defined in claim 6 wherein the Bm value of at least one said ferromagnetic material is above 8,000 gauss.

8. An article as defied in claim 1 wherein said first population is selected from iron-oxide powder or chromium oxide powder.

9. Article as defined in claim 8 wherein the Bm value of at least one said ferromagnetic material is above 8,000 gauss.

10. An article as defined in claim 8 wherein there is a third population of ferromagnetic material that can be either switched or erased without substantial effect on either of the first or second said populations.

11. Article as defined in claim 1 wherein the Bm value of at least one said ferromagnetic material is above 8,000 gauss.

12. An article as defined in claim 11 wherein there is a third population of ferromagnetic material that can be either switched or erased without substantial effect on either of the first or second said populations.

13. An article as defined in claim 1 wherein there is a third population of ferromagnetic material that can be either switched or erased without substantial effect on either of the first or second said populations.

14. A polymodal magnetic recording member comprising two different ferromagnetic compositions, said composition distinguished by a difference of at least 200 in coercive force between the ferromagnetic components thereof, and wherein said compositions are separated by a spacing element formed of polymeric film.

15. An article as defined in claim 1 wherein said ferromagnetic component is mounted on the surface of said article.

* * * * *

UNITED STATES PATENT AND TRADEMARK OFFICE
CERTIFICATE OF CORRECTION

PATENT NO. : 4,237,189
DATED : December 2, 1980
INVENTOR(S) : Robert J. Deffeyes It is certified that error appears in the above-identified patent and that said Letters Patent are hereby corrected as shown below:

Title Page - Item [73] - Change the name of the Assignee from "Robert J. Deffeyes, Arlington, Texas" to --Graham Magnetics, Incorporated.

Col. 2, line 49 "or" should read --of--

Col. 2, line 61 "oerstead" should read --oersted--

Col. 3, line 49 "issures" should read --issuers--

Col. 3, line 56 "a" should read --an--

Col. 4, line 53 "have" should read --having--

Col. 6, line 66 "an" should read --a--

Col. 7, line 21 "a" should read --an--

Col. 7, line 46 "difference" should read --different--

Signed and Sealed this

Tenth Day of July 1984

[SEAL]

Attest:

GERALD J. MOSSINGHOFF

Attesting Officer  Commissioner of Patents and Trademarks